US006327645B1

(12) United States Patent
Hsiao et al.

(10) Patent No.: US 6,327,645 B1
(45) Date of Patent: Dec. 4, 2001

(54) CACHE MEMORY SYSTEM WITH MEMORY REQUEST ADDRESS QUEUE, CACHE WRITE ADDRESS QUEUE, AND CACHE READ ADDRESS QUEUE

(75) Inventors: Chien-Chung Hsiao, Penghu Hsien; Chih-Chin Chen, Chiayi Hsien, both of (TW)

(73) Assignee: Silicon Integrated Systems Corp. (TW)

( * ) Notice: Subject to any disclaimer, the term of this patent is extended or adjusted under 35 U.S.C. 154(b) by 0 days.

(21) Appl. No.: 09/436,270

(22) Filed: Nov. 8, 1999

(51) Int. Cl.$^7$ ..................................................... G06F 12/08
(52) U.S. Cl. ............................ 711/140; 711/118; 711/169
(58) Field of Search ................................... 711/140, 118, 711/125, 126, 168, 169

(56) References Cited

U.S. PATENT DOCUMENTS

| 4,761,731 | 8/1988 | Webb | 364/200 |
|---|---|---|---|
| 5,148,536 | * 9/1992 | Witek et al. | 711/140 |
| 5,327,570 | 7/1994 | Foster et al. | 395/800 |
| 5,355,467 | 10/1994 | MacWilliams | 395/425 |
| 5,515,521 | 5/1996 | Whitted, III et al. | 395/403 |
| 5,598,551 | 1/1997 | Barajas et al. | 395/484 |
| 5,687,348 | 11/1997 | Whittaker | 395/460 |
| 5,761,445 | 6/1998 | Nguyen | 395/280 |
| 5,761,708 | 6/1998 | Cherabuddi | 711/118 |
| 5,765,220 | 6/1998 | Kipp | 711/220 |
| 5,809,530 | * 9/1998 | Samra et al. | 711/140 |
| 5,860,117 | 1/1999 | Cherabuddi | 711/151 |
| 5,860,158 | 1/1999 | Pai et al. | 711/118 |
| 5,905,509 | 5/1999 | Jones et al. | 345/520 |
| 6,021,471 | * 2/2000 | Stiles et al. | 711/140 |
| 6,226,713 | * 5/2001 | Mehrotra | 711/118 |

* cited by examiner

Primary Examiner—Do Hyun Yoo
Assistant Examiner—Gary J. Portka
(74) Attorney, Agent, or Firm—Ladas & Parry

(57) ABSTRACT

A cache memory system includes a main memory controller for retrieving memory data from a main memory unit, a cache memory for writing the memory data retrieved by the main memory controller therein, and a tag memory module for detecting presence of a cache hit condition, indicating that an address signal received thereby has a corresponding data entry in the cache memory, or a cache miss condition, indicating a need for accessing the main memory unit. An address queue of a read data controller receives a cache memory address corresponding to the address signal from the tag memory module, and provides the cache memory address to the cache memory to control reading of the memory data from the cache memory. An address queue of a data request controller receives a main memory address and the cache memory address that correspond to the address signal from the tag memory module in the event of the cache miss condition, and provides the main memory address to the main memory controller to control retrieval of the memory data from the main memory unit. An address queue of a write data controller receives the cache memory address from the data request controller, and provides the cache memory address to the cache memory to control writing of the memory data in the cache memory.

4 Claims, 3 Drawing Sheets

| MAIN MEMORY ADDRESS | CACHE MEMORY ADDRESS |
|---|---|
| . | . |
| . | . |
| . | . |
| . | . |
| . | . |
| . | . |
| . | . |
| . | . |
| . | . |
| . | . |
| . | . |
| . | . |
| . | . |
| . | . |
| . | . |
| . | . |

F I G. 3

CACHE MEMORY SYSTEM WITH MEMORY REQUEST ADDRESS QUEUE, CACHE WRITE ADDRESS QUEUE, AND CACHE READ ADDRESS QUEUE

BACKGROUND OF THE INVENTION

1. Field of the Invention

The invention relates to a cache memory system suitable for use in a graphics rendering system to reduce memory traffic and improve the performance of the graphics rendering system.

2. Description of the Related Art

A typical three-dimensional (3D) graphics display system includes a graphics rendering processor, a display memory unit and a display monitor. The display memory unit stores many kinds of data, including pixel color values (R, G, B), pixel transparency or alpha value (A), depth value (Z), texture image data, etc.

These data are generally read out from the display memory, processed, and then written back into the display memory, if necessary.

In order to generate photo-realistic 3D graphics images, each pixel may apply texture mapping, alpha blending, fog blending, etc. Texture mapping is a process where texture image data is read from the texture memory and is applied on each pixel. For each pixel, combinations of 1, 2, 4, 8 or more texture image data with different resolutions may be derived according to the rendering quality requirement, thereby necessitating a great deal of texture memory accesses that increases the loading on memory traffic. It is apparent that memory bandwidth will dominate the system performance and will become the bottleneck of the graphics rendering operation, if a lot of texture mapped objects are rendered, no matter how fast the graphics rendering processor runs.

A general strategy adopted to resolve this problem is to introduce a cache memory system into the graphics rendering system. With a suitable cache replacement scheme, the number of texture memory accesses can be reduced. However, since a pipeline structure is commonly employed in a 3D graphics engine design, most designs will have their pipeline processes stall when there is a cache miss. If the graphics rendering system has a deep pipeline structure, in the event that the requested memory data returns after n clock cycles, n bubbles will emerge in the pipeline. These bubbles can cause idling of the rendering engine and will degrade the overall performance of the graphics rendering system.

SUMMARY OF THE INVENTION

Therefore, the object of the present invention is to provide a cache memory system that incorporates a memory request address queue, a cache write address queue and a cache read address queue to absorb the latency of memory access when a cache miss condition occurs, and to minimize the occurrence of pipeline stalling in a pipelined design.

According to the present invention, a cache memory system is adapted for use with a main memory unit, and comprises:

a main memory controller adapted to be connected to the main memory unit so as to retrieve memory data therefrom;

a cache memory connected to the main memory controller for writing the memory data retrieved by the main memory controller therein;

a tag memory module adapted to receive an address signal and to detect presence of a cache hit condition, indicating that the address signal has a corresponding data entry in the cache memory, or a cache miss condition, indicating a need for accessing the main memory unit;

a read data controller interconnecting the tag memory module and the cache memory, the read data controller including a cache read address queue that receives a cache memory address corresponding to the address signal from the tag memory module, and that provides the cache memory address as a cache read address to the cache memory to control reading of the memory data from the cache memory;

a data request controller interconnecting the tag memory module and the main memory controller, the data request controller including a memory request address queue that receives a main memory address and the cache memory address that correspond to the address signal from the tag memory module in the presence of the cache miss condition, and that provides the main memory address to the main memory controller to control retrieval of the memory data from the main memory unit; and a write data controller interconnecting the data request controller and the cache memory, the write data controller including a cache write address queue that receives the cache memory address from the memory request address queue, and that provides the cache memory address as a cache write address to the cache memory to control writing of the memory data in the cache memory.

Preferably, a data ready bit array is employed to inhibit the read data controller from providing the cache read address to the cache memory when the corresponding memory data of the main memory unit has yet to be written into the cache memory.

BRIEF DESCRIPTION OF THE DRAWINGS

Other features and advantages of the present invention will become apparent in the following detailed description of the preferred embodiment with reference to the accompanying drawings, of which:

FIG. 3 illustrates a tag look-up table stored in a tag memory module of the preferred embodiment.

DETAILED DESCRIPTION OF THE PREFERRED EMBODIMENT

There are various data buffers, such as a Z buffer, a texture buffer and a frame buffer, in a display memory of a 3D graphics display system, and there are many operations that will access these buffers. However, the data buffers are shared and thus, the bandwidth of the display memory is also shared for purposes of data access and monitor display.

Figure 1:
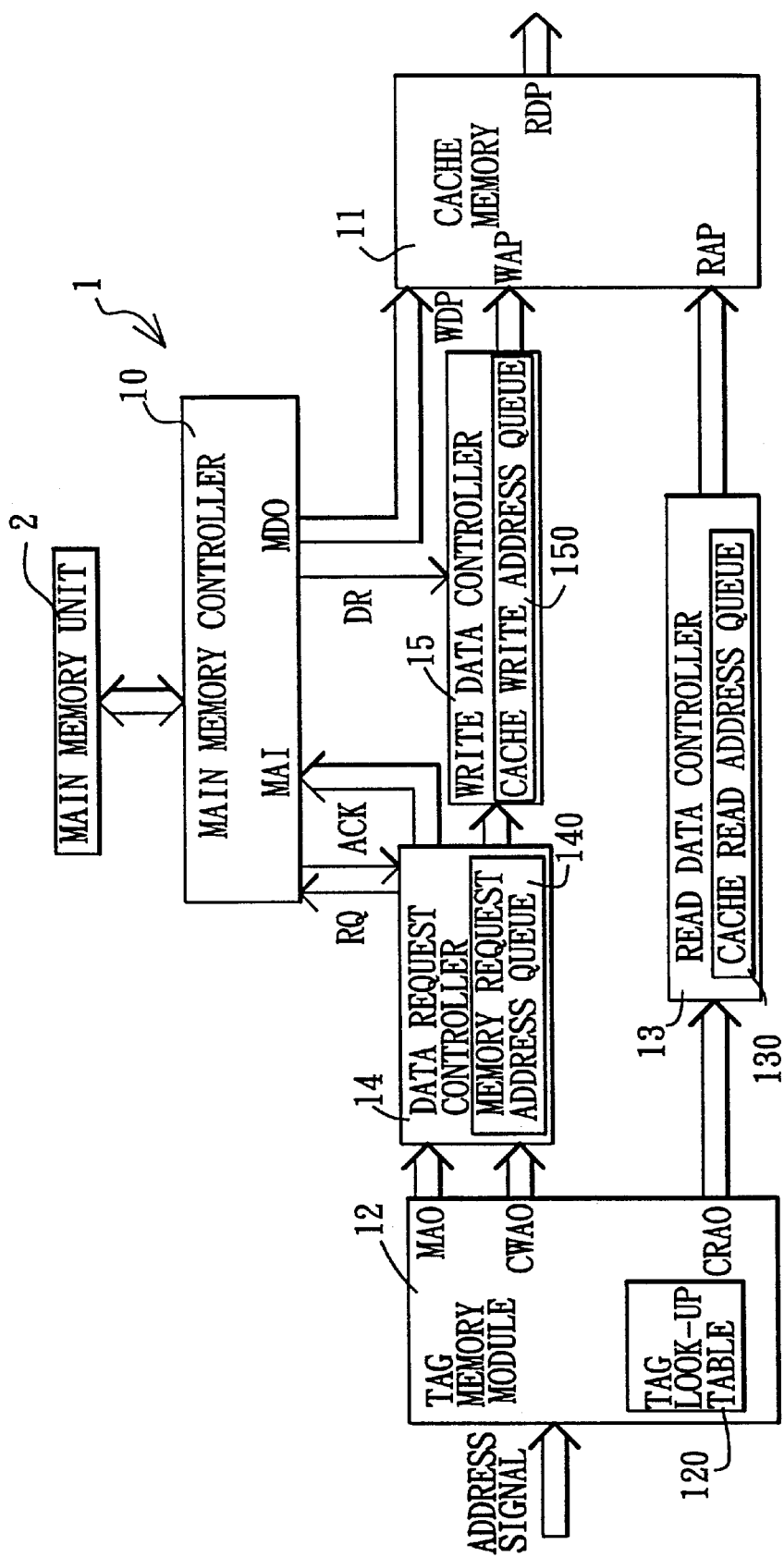
FIG. 1 is a schematic circuit block diagram illustrating the preferred embodiment of a cache memory system according to the present invention.

FIG. 1 illustrates a cache memory system 1 adapted for use with a display memory, which serves as a main memory unit 2, of a 3D graphics display system to reduce the number and latency of data accesses from the main memory unit 2. The cache memory system 1 includes a main memory controller 10, a cache memory 11, a tag memory module 12, a read data controller 13, a data request controller 14, a write data controller 15 and a data bit array 16 (see FIG. 2).

The main memory controller 10 has a memory address input (MAI) and a memory data output (MDO). The main memory controller 10 is adapted to be connected to the main memory unit 2, and is adapted to retrieve memory data of the main memory unit 2 corresponding to a requested memory address at the memory address input (MAI), and to provide the memory data retrieved thereby at the memory data output (MDO). In the preferred embodiment, the main memory controller 10 can be the interface between a graphics rendering system (not shown) and the main memory unit 2. Alternatively, the main memory controller 10 can be an AGP controller that accesses the memory data from the main memory unit 2 through the AGP bus (not shown).

The cache memory 11, which serves as a texture cache for the main memory unit 2, has a plurality of addressable storage locations, a write address port (WAP), a write data port (WDP), a read address port (RAP) and a read data port (RDP). The write address port (WAP) is used to receive a cache write address for addressing the storage locations of the cache memory 11. The write data port (WDP) is connected to the memory data output (MDO) of the main memory controller 10 so as to receive the memory data therefrom for storage in the storage location that is addressed by the cache write address. The read address port (RAP) is used to receive a cache read address for addressing the storage locations of the cache memory 11. The read data port (RDP) is used to output the memory data stored in the storage location that is addressed by the cache read address.

Figure 3:
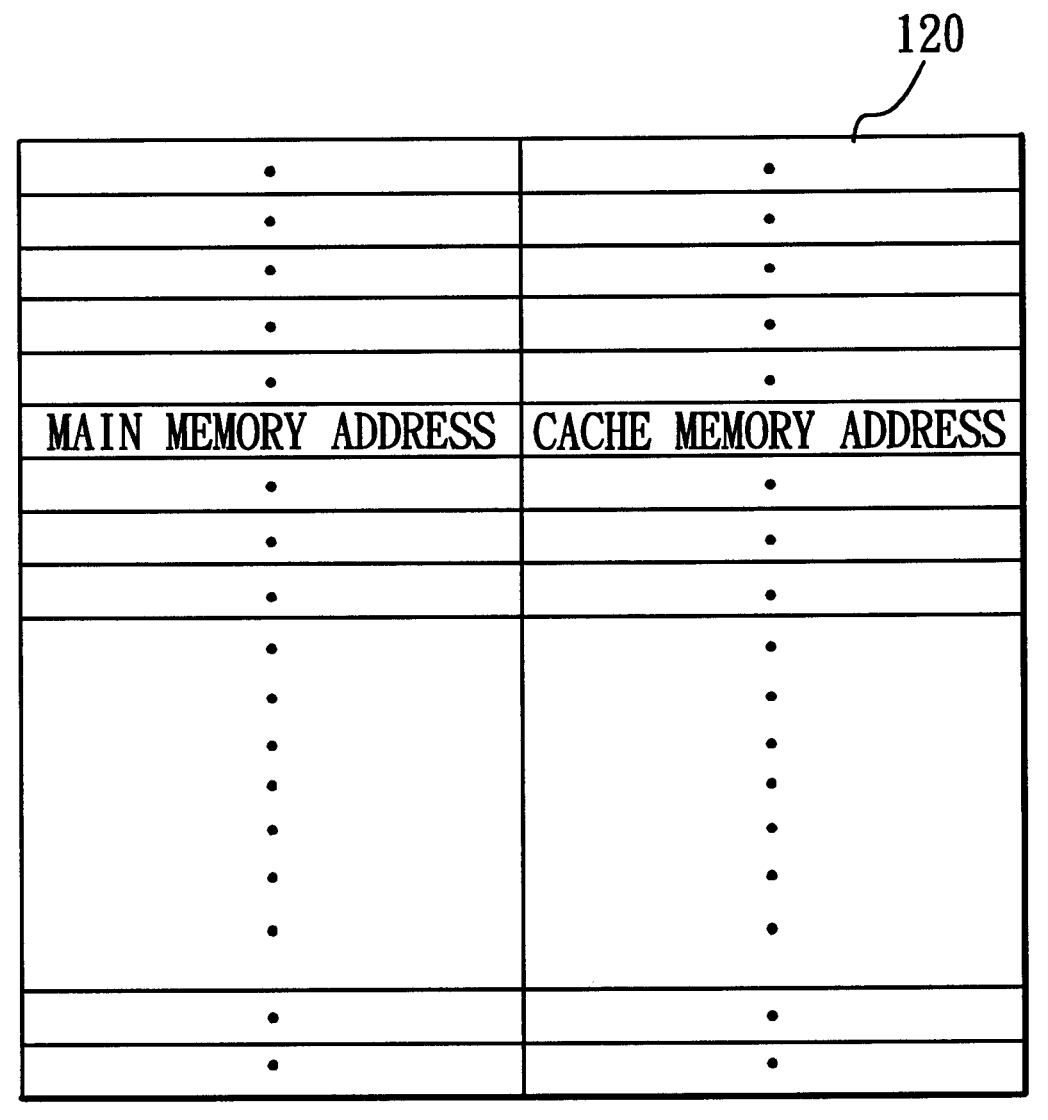

The tag memory module 12, such as a random access memory (RAM) module, is used to store a tag look-up table 120 therein. As shown in FIG. 3, the tag look-up table 120 has a plurality of entries, each of which includes a main memory address of a storage location of the main memory unit 2, and a cache memory address of one of the storage locations of the cache memory 11. The tag memory module 12 is adapted to receive an input address signal, and determines the presence of a cache hit condition, where the input address signal corresponds to the main memory address of one of the entries of the tag look-up table 120, or a cache miss condition, where the input address signal does not correspond to the main memory address of any one of the entries of the tag look-up table 120. The tag memory module 12 has a missed address output (MAO), a cache write address output (CWAO) and a cache read address output (CRAO). Upon determining the presence of the cache hit condition, which indicates the presence of a valid data entry in the cache memory 11, the tag memory module 12 outputs the cache memory address, which belongs to the entry of the tag look-up table 120 corresponding to the input address signal, at the cache read address output (CRAO). Upon determining the presence of the cache miss condition, which indicates the need for access to the main memory unit 2, the tag memory module 12 generates the cache memory address of a selected one of the storage locations of the cache memory 11 to correspond with the input address signal. Selection of the storage location of the cache memory 11 can be done using known cache replacement techniques, such as a first-in first-out (FIFO) scheme or a least used scheme, to allocate space for the memory data retrieved by the main memory controller 10 from the main memory unit 2. Thereafter, the main memory address and the cache memory address that correspond to the input address signal are stored as one of the entries in the tag look-up table 120. Finally, the main memory address that corresponds to the input address signal is outputted at the missed address output (MAO), whereas the cache memory address that corresponds to the input address signal is outputted at both the cache write address output (CWAO) and the cache read address output (CRAO).

Figure 2:
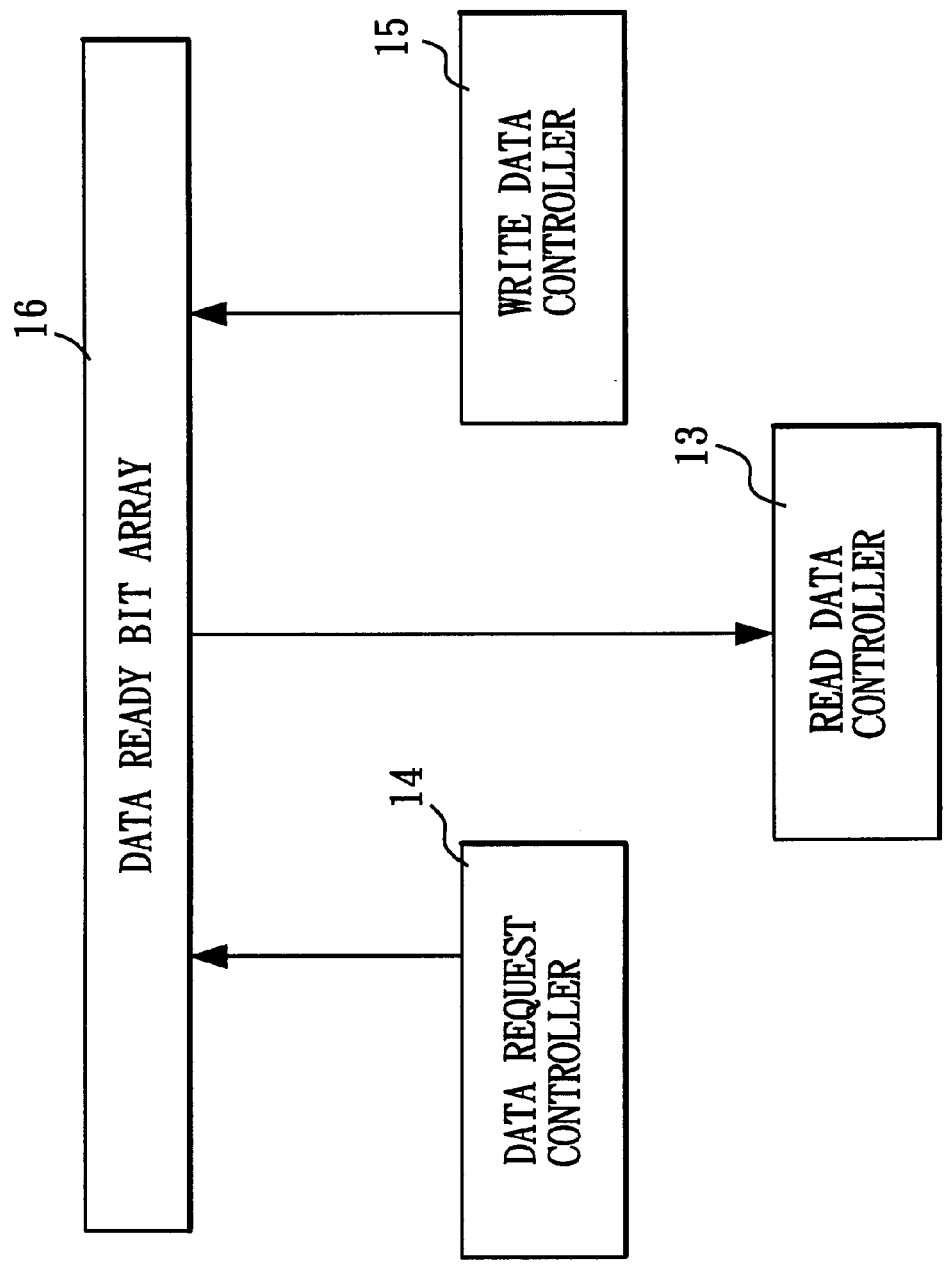
FIG. 2 is a schematic circuit block diagram illustrating a read data controller, a data request controller, a write data controller, and a data ready bit array of the preferred embodiment.

The data request controller 14 is connected to the missed address output (MAO) and the cache write address output (CWAO) of the tag memory module 12, and to the memory address input (MAI) of the main memory controller 10. The data request controller 14 includes a memory request address queue 140 that receives the main memory address from the missed address output (MAO) and the cache memory address from the cache write address output (CWAO), and that provides the main memory address as the requested memory address to the memory address input (MAI) in a first-in, first-out manner. As shown in FIG. 2, the data request controller 14 is further connected to the data ready bit array 16, which has a plurality of status bits that correspond respectively to the storage locations of the cache memory 11. The data request controller 14 generates a request (RQ) signal to the main memory controller 10 whenever a requested memory address is to be provided to the memory address input (MAI). The main memory controller 10 issues an acknowledge (ACK) signal upon receiving the requested memory address from the data request controller 14. At this time, the data request controller 14 sets the status bit of the data ready bit array 16 corresponding to the storage location of the cache memory 11 addressed by the cache memory address associated with the requested memory address to a first state, such as a logic 0 state.

Referring again to FIG. 1, the write data controller 15 is connected to the data request controller 14 and the write address port (WAP) of the cache memory 11. The write data controller 15 includes a cache write address queue 150 that receives the cache memory address from the memory request address queue 140 when the data request controller 14 receives the acknowledge (ACK) signal from the main memory controller 10, and that provides the cache memory address as the cache write address to the write address port (WAP) in a first-in, first-out manner. As shown in FIG. 2, the write data controller 15 is further connected to the data ready bit array 16. The main memory controller 10 issues a data-ready (DR) signal to the write data controller 15 whenever the memory data retrieved thereby from the main memory unit 2 is available at the memory data output (MDO). In response to the data-ready (DR) signal, aside from providing the cache write address to the write address port (WAP) so as to commence writing of data into the cache memory 11, the write data controller 15 further sets the status bit of the data ready bit array 16 corresponding to the storage location of the cache memory 11 addressed by the cache write address to a second state, such as a logic 1 state, so as to indicate the availability of data.

As shown in FIG. 1, the read data controller 13 is connected to the cache read address output (CRAO) of the tag memory module 12 and the read address port (RAP) of the cache memory 11. The read data controller 13 includes a cache read address queue 130 that receives the cache memory address from the cache read address output (CRAO), and that provides the cache memory address as the cache read address to the read address port (RAP) in a first-in, first-out manner so as to commence reading of data from the cache memory 11. Referring to FIG. 2, the read data controller 13 is also connected to the data ready bit array 16. By checking the state of the status bit that corresponds to the storage location of the cache memory 11 addressed by the cache read address, the read data controller 13 can be inhibited from providing the cache read address to the read address port (RAP) when the aforesaid status bit is in the first state. In other words, the read data controller 13 can be inhibited from providing the cache read address to the cache memory 11 when the corresponding memory data of the main memory unit 2 has yet to be written into the cache memory 11.

In general, cache hit and cache miss can occur randomly and are shuffled together. Cache read addresses are pushed into the cache read address queue 130 regardless of whether a cache hit or cache miss condition is detected by the tag memory module 12. Memory addresses are pushed into the memory request address queue 140 to provide a buffering effect when a cache miss condition is detected. Memory requests are sent by the data request controller 14 for those addresses in the memory request address queue 140, and the main memory controller 10 responds to these requests by acquiring the corresponding memory data from the main memory unit 2. Cache write addresses are pushed by the data request controller 14 into the cache write address queue 150 of the write data controller 15 in order to maintain the order of data access to the cache memory 11. As soon as the desired memory data becomes available from the main memory controller 10, they will be written into the cache memory 11. By virtue of the data ready bit array 16, the read data controller 13 can be informed that the desired memory data has been written into and can be accessed from the cache memory 11. By adopting suitable lengths for the address queues 130, 140, 150, pipeline stalling caused by the latency of memory access can be reduced to ensure smooth execution in the event of a cache miss condition. In addition, with the deployment of an appropriate cache replacement scheme, the cache hit rate can be increased, the memory access time can be reduced.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

We claim:

1. A cache memory system for use with a main memory unit, comprising:

a main memory controller having a memory address input and a memory data output, the main memory controller being adapted to be connected to the main memory unit and being adapted to retrieve memory data of the main memory unit corresponding to a requested memory address at the memory address input, and to provide the memory data retrieved thereby at the memory data output;

a cache memory having a plurality of addressable storage locations, a write address port to receive a cache write address for addressing one of the storage locations, a write data port connected to the memory data output of the main memory controller so as to receive the memory data therefrom for storage in said one of the storage locations addressed by the cache write address, a read address port to receive a cache read address for addressing one of the storage locations, and a read data port to output the memory data stored in said one of the storage locations addressed by the cache read address;

a tag memory module for storing a tag look-up table that includes a plurality of entries, each of the entries including a main memory address of a storage location of the main memory unit and a cache memory address of one of the storage locations of the cache memory, the tag memory module being adapted to receive an address signal, and determining presence of a cache hit condition, where the address signal corresponds to the main memory address of one of the entries of the tag look-up table, or a cache miss condition, where the address signal does not correspond to the main memory address of any one of the entries of the tag look-up table, the tag memory module having a missed address output, a cache write address output and a cache read address output, the tag memory module, upon determining the presence of the cache hit condition, which indicates presence of a valid data entry in the cache memory, outputting the cache memory address belonging to the entry of the tag look-up table that corresponds to the address signal at the cache read address output, the tag memory module, upon determining the presence of the cache miss condition, which indicates need for access to the main memory unit, generating the cache memory address of a selected one of the storage locations of the cache memory to correspond with the address signal, storing the main memory address and the cache memory address that correspond to the address signal as one of the entries of the tag look-up table, outputting the main memory address that corresponds to the address signal at the missed address output, and outputting the cache memory address that corresponds to the address signal at the cache write address output and the cache read address output;

a read data controller connected to the cache read address output of the tag memory module and the read address port of the cache memory, the read data controller including a cache read address queue for receiving the cache memory address from the cache read address output, and for providing the cache memory address as the cache read address to the read address port in a first in, first out manner;

a data request controller connected to the missed address output and the cache write address output of the tag memory module, and to the memory address input of the main memory controller, the data request controller including a memory request address queue for receiving the main memory address from the missed address output and the cache memory address from the cache write address output, and for providing the main memory address as the requested memory address to the memory address input in a first in, first out manner; and a write data controller connected to the data request controller and the write address port of the cache memory, the write data controller including a cache write address queue for receiving the cache memory address from the memory request address queue, and for providing the cache memory address as the cache write address to the write address port in a first in, first out manner.

2. The cache memory system of claim 1, further comprising a data ready bit array having a plurality of status bits that correspond respectively to the storage locations of the cache memory, the data ready bit array being connected to the data request controller, the write data controller and the read data controller, the data request controller being responsible for setting one of the status bits corresponding to the storage location of the cache memory addressed by the cache memory address that is provided thereby to the cache write address queue to a first state, the write data controller being responsible for setting one of the status bits corresponding to the storage location of the cache memory addressed by the cache write address that is provided thereby to the write address port to a second state, the read data controller being inhibited from providing the cache read address to the read address port when the status bit that corresponds to the storage location of the cache memory addressed by the cache read address is in the first state.

3. A cache memory system for use with a main memory unit, comprising:

a main memory controller adapted to be connected to the main memory unit so as to retrieve memory data therefrom;

a cache memory connected to the main memory controller for writing the memory data retrieved by the main memory controller therein;

a tag memory module adapted to receive an address signal and to detect presence of a cache hit condition, indicating that the address signal has a corresponding data entry in the cache memory, or a cache miss condition, indicating a need for accessing the main memory unit;

a read data controller interconnecting the tag memory module and the cache memory, the read data controller including a cache read address queue that receives a cache memory address corresponding to the address signal from the tag memory module, and that provides the cache memory address as a cache read address to the cache memory to control reading of the memory data from the cache memory;

a data request controller interconnecting the tag memory module and the main memory controller, the data request controller including a memory request address queue that receives a main memory address and the cache memory address that correspond to the address signal from the tag memory module in the presence of the cache miss condition, and that provides the main memory address to the main memory controller to control retrieval of the memory data from the main memory unit; and a write data controller interconnecting the data request controller and the cache memory, the write data controller including a cache write address queue that receives the cache memory address from the memory request address queue, and that provides the cache memory address as a cache write address to the cache memory to control writing of the memory data in the cache memory.

4. The cache memory system of claim 3, further comprising means for inhibiting the read data controller from providing the cache read address to the cache memory when the corresponding memory data of the main memory unit has yet to be written into the cache memory.

\* \* \* \* \*